United States Patent
Astudillo

(10) Patent No.: US 6,279,239 B1
(45) Date of Patent: Aug. 28, 2001

(54) DEVICE AND A METHOD FOR SIZING ODD PARTS OF DRYWALL FOR PLACEMENT ON CEILINGS AND WALLS

(76) Inventor: Edward Astudillo, 260 Axminster Dr., Richmond Hill, Ontario (CA), L4C 2W1

( * ) Notice: Subject to any disclaimer, the term of this patent is extended or adjusted under 35 U.S.C. 154(b) by 0 days.

(21) Appl. No.: 09/294,276

(22) Filed: Apr. 19, 1999

(51) Int. Cl.⁷ .................................................. G01C 15/00
(52) U.S. Cl. .............................. 33/286; 33/276; 33/282; 33/285; 33/DIG. 21
(58) Field of Search ............................... 33/286, DIG. 21, 33/276, 278, 282, 285, 484, 485

(56) References Cited

U.S. PATENT DOCUMENTS

| | | | |
|---|---|---|---|
| 3,589,014 | * 6/1971 | Sarl | 33/286 |
| 3,897,637 | 8/1975 | Genho | 33/227 |
| 4,025,192 | 5/1977 | Scholdstrom et al. | 356/152 |
| 4,630,379 | 12/1986 | Wickmann et al. | 33/228 |
| 5,077,905 | 1/1992 | Murray, Jr. | 33/412 |
| 5,144,487 | * 9/1992 | Hersey | 33/286 |
| 5,268,829 | 12/1993 | Lo | 362/259 |
| 5,307,253 | 4/1994 | Jehn | 362/259 |
| 5,335,150 | 8/1994 | Huang | 362/259 |
| 5,343,376 | 8/1994 | Huang | 362/118 |
| 5,519,942 | * 5/1996 | Webb | 33/290 |
| 5,531,031 | 7/1996 | Green | 33/365 |
| 5,551,159 | 9/1996 | Mooty | 33/228 |
| 5,561,911 | 10/1996 | Martin | 33/365 |
| 5,594,993 | 1/1997 | Tager et al. | 33/227 |
| 5,604,987 | * 2/1997 | Cupp | 33/286 |
| 5,617,645 | * 4/1997 | Wick et al. | 33/551 |
| 5,713,135 | * 2/1998 | Acopulos | 33/451 |
| 5,778,542 | 7/1999 | Spoto | 33/613 |
| 5,838,639 | 11/1998 | Hwang | 368/10 |
| 5,842,282 | 12/1998 | Ting | 33/227 |
| 5,864,956 | * 2/1999 | Dong | 33/227 |
| 5,894,675 | * 4/1999 | Cericola | 33/451 |
| 5,966,826 | * 10/1999 | Ho | 33/365 |
| 6,012,229 | * 1/2000 | Shiao | 33/365 |
| 6,065,217 | * 5/2000 | Dong | 33/290 |
| 6,202,312 | * 3/2001 | Rando | 33/227 |

FOREIGN PATENT DOCUMENTS

| | | | |
|---|---|---|---|
| 4-13919 | * 1/1992 | (JP) | 33/286 |
| 91/02217 | * 2/1991 | (WO) | 33/286 |

* cited by examiner

*Primary Examiner*—Randy W. Gibson
(74) *Attorney, Agent, or Firm*—Dinsmore & Shohl

(57) ABSTRACT

An integral apparatus having laser sighting means embodied in a pocket sized device, for use in determining end points along ceilings and wall perimeter edges to more accurately size drywall pieces to be installed in generally non-rectangular perimeter sections of ceilings and walls. The sighting apparatus, comprises a housing having a longitudinally elongated base member and a longitudinally elongated column member, said base member and column member being at right angles to one another and joined longitudinally to one another, said base member and column member having opposing parallel and substantially flat longitudinal faces and an edge surface extending between the longitudinal faces, thereby defining at least one rail having two longitudinal perpendicular surfaces; a laser module and batteries. In a preferred embodiment, laser modules are provided at each axial end of the housing to enable beams to be selectively projected in either longitudinal direction. In a further embodiment, a laser module is provided to emit from a longitudinal surface of the housing, in a direction parallel to a first rail surface or a perpendicular second rail surface.

12 Claims, 7 Drawing Sheets

DEVICE AND A METHOD FOR SIZING ODD PARTS OF DRYWALL FOR PLACEMENT ON CEILINGS AND WALLS

FIELD OF THE INVENTION

This invention pertains generally to a device and a method for sizing odd shaped sections of drywall for placement on ceilings and walls, and more specifically, it is directed to a compact laser sighting device to aid in sizing odd shaped sections of drywall.

BACKGROUND OF THE INVENTION

The art of fitting and measuring drywall pieces being installed in commercial and residential construction projects has not changed much in many years. Typically, a large set square and a stick have been employed. Working on ceilings is extremely difficult and generally two or more persons must work as a team.

In finishing ceilings and walls of ballrooms, dining rooms, etc., certain difficulties may be encountered. For example, when a designer or an architect designates that a circular recessed or drop-down section be fitted into the ceiling, to house a chandelier or the like it is a challenge to accurately fit drywall sheet sections against the perimeter of a circular recess or drop-down section perimeter.

Ultimately, the person installing the drywall, i.e. a drywaller, will make a rough estimation as to distance between points along the circular recessed or drop-down section and a nearby drywall sheet and from these the drywaller will be able to approximately size a drywall sheet to be fitted against a portion of the perimeter of the drop-down or recessed ceiling section. Even after installation of the new piece of drywall, often there is a significant gap along the perimeter section, which must be filled in with further pieces of drywall and mortar-mix. As a result, significant time is wasted fixing and finishing the installed drywall ceiling edges.

At the corners of the ceiling, a designer or an architect may designate that the corners be angled, such that the ceiling will resemble a pentagon, hexagon, or a triangular alcove. Sizing drywall sheets, to fill in these ceiling perimeter sections have been, to date, time consuming and messy.

To size drywall for such alcoves, it is required to section the ceiling of the alcove off into parts, into imaginary right angled triangles and rectangles. The imaginary triangles will have a right angled base along an edge of a previously mounted piece of drywall which is perpendicular to an apex in the alcove. The object is to find the length of the base and the height of the imaginary right angled triangle. Using the existing method, a long, and relatively narrow "working" triangular piece of drywall, preferably having a right angled corner, is used to determine the imaginary right angled triangle's end point on its base, at its right angle corner. By slidably pressing the working triangular piece of drywall's base against the edge of the previously mounted piece of drywall, while the apex of the triangular piece of drywall is horizontal, and aimed at the apex of the alcove, the end point of the base of the imaginary triangle, at its right angled corner, may be determined.

The problem with the above mentioned method is that various lengths of the long, and relatively narrow, "working" triangular pieces of drywall are required. As such, each time an approximate length is created, drywall material is wasted. In addition, error will generally occur when eyeballing the narrow triangle's apex which is being attempted to be inline with the alcove's apex.

Once the drywaller thinks he has lined up the "working" triangle's right angled edge with the apex in the alcove, the drywaller will mark the corresponding point along the edge of the previously mounted piece of drywall. The determination of this point will aid determining the base length and height of the imaginary right angled triangle, and a drywall section may be sized and cut to fill in a portion of the unfinished ceilings alcove area.

Unfortunately again, with the above mentioned approximation method, there are usually significant gaps along the edges of the ceiling to be filled in with further pieces of drywall and mortar-mix, in the alcove, because the base length and the height of the imaginary triangle was inaccurately determined. As a result, significant time is wasted fixing and finishing the installed drywall ceiling edges. A more accurate method of finding the base length and height of the imaginary triangle would alleviate much of the need for fixing and finishing the drywall ceiling edges.

OBJECTS OF THE INVENTION

An object of the present invention is to provide a device and a method to use the device which overcomes disadvantages of the prior art.

It is a related object to provide a tool to enable a worker to accurately size a ceiling or wall section of drywall, to eliminate time consuming mortar mix patch work.

It is a further related object that the tool, which assists in finding the points of contact for fitting and sizing drywall, is either pocket sized or holster sized.

SUMMARY OF THE INVENTION

The present invention relates to a device and method to aid in the sizing of drywall needed to fit against non-rectangular sections of walls or ceilings with greater ease and less error, in less time.

Accordingly, the invention provides a sighting device comprising:
 (a) a housing; and
 (b) at least one laser module;
 wherein the housing comprises a longitudinally elongated base member and a longitudinally elongated column member, said base member and column member being joined longitudinally to one another at right angles to one another, thereby defining a rail, each of said base member and column member having
   i) opposing parallel and substantially flat longitudinal faces and
   ii) an edge surface extending between the longitudinal faces; and
 the housing has at least one chamber, with each chamber housing a laser module; and
 wherein each chamber has an aperture to communicate laser light out of a surface of the housing.

In one embodiment, the sighting device has an electrical supply means associated therewith a trigger circuit board connected to the electrical supply means, a laser diode electrically connected to the trigger circuit board, an on-off switch for controlling supply of electricity between the electrical supply means and the laser diode.

In another embodiment, the sighting device has at least one aperture located at an axial end of the elongated housing.

In a further embodiment, the sighting device has at least one aperture located to project through an elongated surface of the housing, perpendicular to the longitudinal direction of the housing.

In yet another embodiment, the aperture of an axial projecting laser module is about half way into the base member and about half way into the column member.

In another embodiment, a cross-section of the housing, transverse to the longitudinal direction, is in the shape of a "T." or an "L".

In yet another embodiment, the chamber for each laser module permits the laser module to project its laser beam perpendicular to the surface through which it projects.

In another embodiment, the sighting device has a means for selectively activating the laser modules.

In a further embodiment, a transparent overlay having cross-hairs is placed between the laser diode and the aperture.

In yet another embodiment, indicia extend continuously around the sighting device, perpendicular to the longitudinal direction of the sighting device, in the vicinity of a laser mounted perpendicularly to an axially oriented laser.

In another embodiment, indicia extend discontinuously around the sighting device, perpendicular to the longitudinal direction of the sighting device, in the vicinity of a laser mounted perpendicularly to an axially oriented laser.

In another embodiment, the sighting device has a lens held at the aperture to the chamber.

The invention also provides a method for determining placement and size of a new drywall section in a gap adjacent to a previously installed drywall section, said method comprising:

a) placing a longitudinal edge of a sighting device against a first position on an edge of the previously installed drywall section;

b) projecting a laser beam from within a housing of the sighting device across the gap, towards an obstruction;

c) noting a second position where the laser beam strikes the obstruction and noting the first position on the previously installed drywall section, in line with the laser beam;

d) measuring the distance between the first and second positions, along a line of sight of the laser beam;

e) repeating steps a) to c) for as many positions as is necessary to determine the size and shape of the new drywall section.

In one embodiment, the longitudinal edge of the sighting device is i) placed against a longitudinal edge of the previously installed drywall section and the laser beam is projected in a direction parallel to the longitudinal edge of the sighting device, and wherein the obstruction is marked at the second position, and ii) is subsequently placed against an opposing longitudinal edge of the previously installed drywall section and the laser beam is projected in a direction parallel to the longitudinal edge of the sighting device, and wherein the obstruction is marked at a third position where the laser beam strikes the obstruction.

In a further embodiment, for determining placement and size of a new drywall section in a gap which has an apex, a) the longitudinal edge of the sighting device is placed against a longitudinal edge of the previously installed drywall section and the laser beam is projected in a direction parallel to the previously installed drywall section and perpendicular to the longitudinal edge of the sighting device;

b) the sighting device is slid along the longitudinal edge of the previously installed drywall section until the laser beam strikes an apex along the obstruction, said apex along the obstruction corresponding to the apex of the gap;

c) a location along the previously installed drywall section which is adjacent to the projected laser beam is noted;

d) the noted location becomes the base point of an imaginary right angled triangle opposite the apex, measuring the distance between the noted location, and measuring the distance between the noted location and a point where the obstruction meets the previously installed drywall section, and obtaining the height and base width of the triangle from such measurements;

e) the new drywall section is cut to the size of the triangle; and f) the new drywall section is placed in the gap of the imaginary triangle.

In accordance with the teachings of the present invention, in a preferred embodiment the invention comprises an integral pocket sized device having at least one laser module, which may be used by drywall workers to determine points of contact along drywall sections on ceilings and on walls, to more accurately size drywall sections.

The device is especially helpful in sizing drywall sections to be installed in generally non-rectangular perimeter sections of ceilings and walls.

The present invention is advantageous in that both skilled, and unskilled, drywall workers are provided with a means to facilitate mounting of drywall sections more accurately and in less time than they would do so otherwise without the device.

BRIEF DESCRIPTION OF DRAWINGS

An embodiment of the invention will now be described by way of example with reference to the drawings, in which.

DETAILED DESCRIPTION

Figure 1:
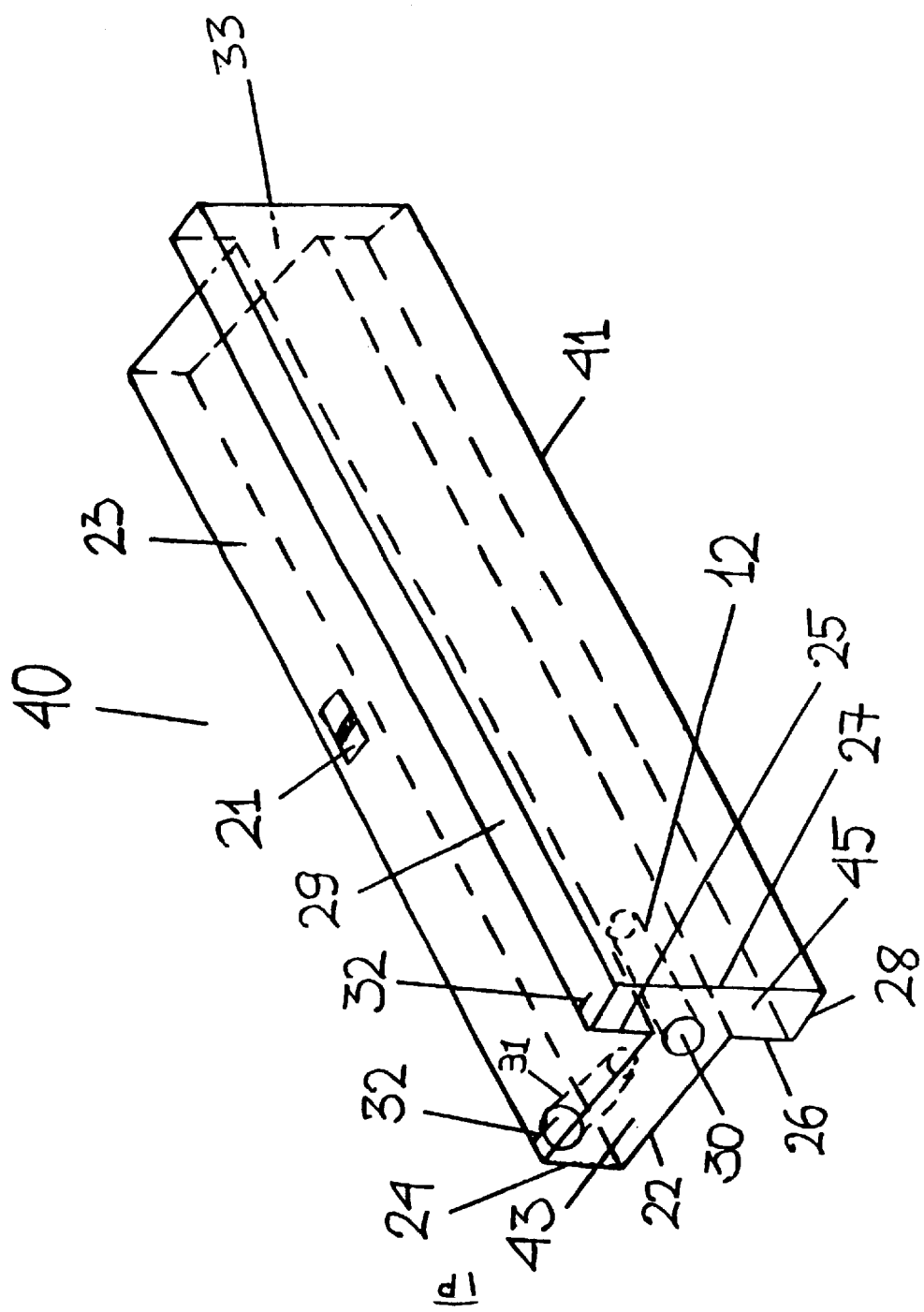
FIG. 1 is a perspective view of one embodiment of a compact laser sighting device, according to the invention, having a "T" cross-section.

FIG. 1 is a perspective view of a preferred sighting device 40. The sighting device 40 has a housing 41 and at least one laser module 12. The housing 41 has a longitudinally elongated base member 45 and a longitudinally elongated column member 43. Base member 45 and column member 43 are at right angles to one another and joined longitudinally to one another. Base member 45 has opposing parallel and substantially flat longitudinal faces 25/26 and 27, and edge surfaces 28 and 29. Column member 43 has opposing parallel and substantially flat longitudinal faces 22 and 23, and edge surface 24. The combined base member and column member forms a T-shaped rail which has an end surface 33. The housing 41 has at least one chamber 30. Each chamber houses a laser module 12. Each chamber has an aperture to communicate laser light through a surface of the housing.

Preferably, the sighting device has an electrical supply means (not shown in the drawings) associated therewith and a trigger circuit board (not shown in the drawings) connected to the electrical supply means. Each laser module 12 has a laser diode (not shown in the drawings), and preferably there is a lens (not shown in the drawings) held at the aperture to the chamber. An on-off switch 21 is attached to the housing 41. Preferably the on-off switch is flush mounted on the housing, e.g. on the column, as shown in FIG. 1. The on-off switch controls current from the electrical supply means to the laser diode. As will be known to those skilled in the art, the on-off-switch may be positioned between the electrical supply means and the trigger circuit board, or between the trigger circuit board and the laser diode. Other means for energizing the laser diode may be used, as will be apparent to those skilled in the art.

The electrical supply means may be a battery or an AC electrical power outlet. The use of an AC electrical power outlet requires a connecting wire between the AC electrical power outlet and the sighting device, which tends to be cumbersome. Batteries are preferred. Although the drywaller may carry a battery pack, e.g. attached to a drywaller's belt, and there be a supply wire from the battery pack to the sighting device 40, it is even more preferable for the battery means to be housed in the sighting device 40. The battery means may be, for example, an alkaline battery or a rechargeable battery. The size of the sighting device 40 and the power of the laser may permit use of an AAA size battery. Alternatively, the electrical supply means may be a solar cell (not shown in the drawings) attached to the housing 41.

Preferably, the sighting device 40 has a chamber 30 located at an axial end of the elongated housing 41. The chamber 30 houses a laser 10, from which a laser beam may be projected through an aperture in the housing. In a preferred embodiment, chambers are located at both axial ends, each chamber having a laser therein.

Figure 2:
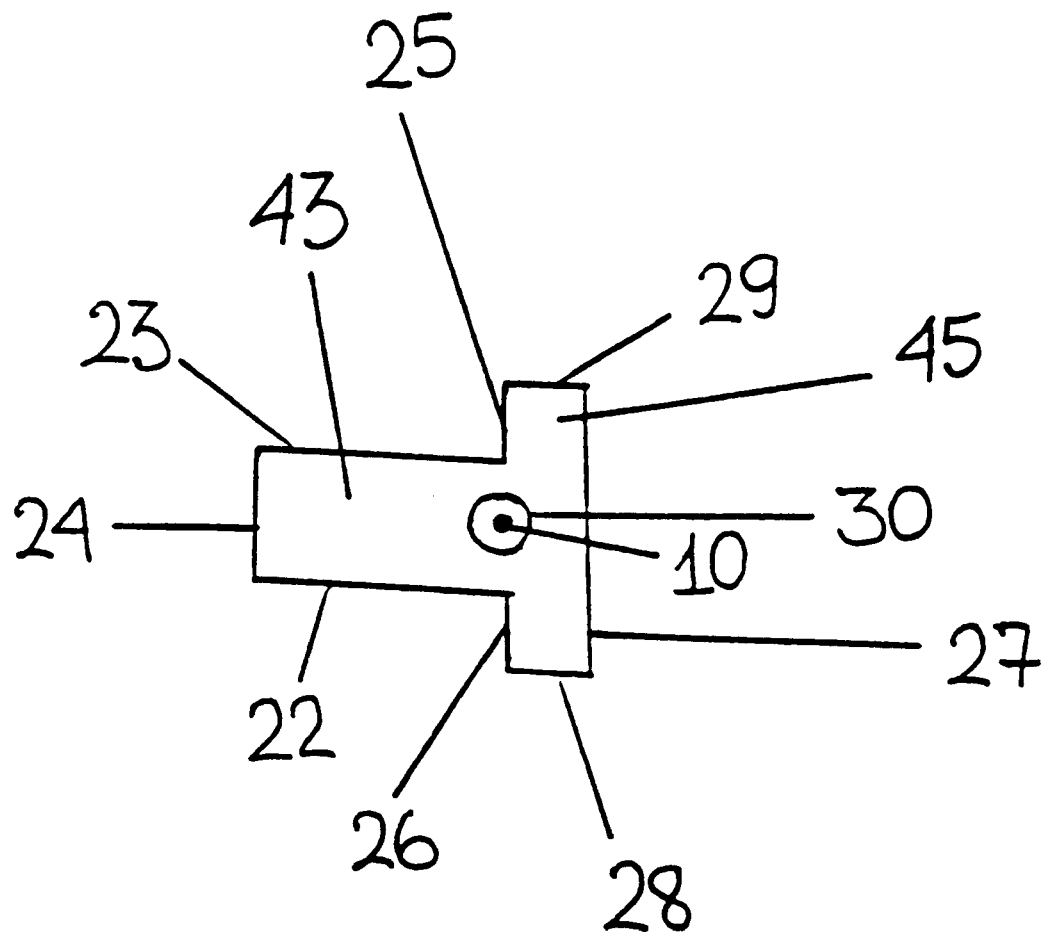
FIG. 2 is an end view of the compact laser sighting apparatus shown in FIG. 1.

Preferably, each axial chamber 30 of the sighting device 40 are configured so that about half of the chamber is in base member 45 and about half is in column member 43, as shown in FIGS. 1 and 2.

Figure 3:
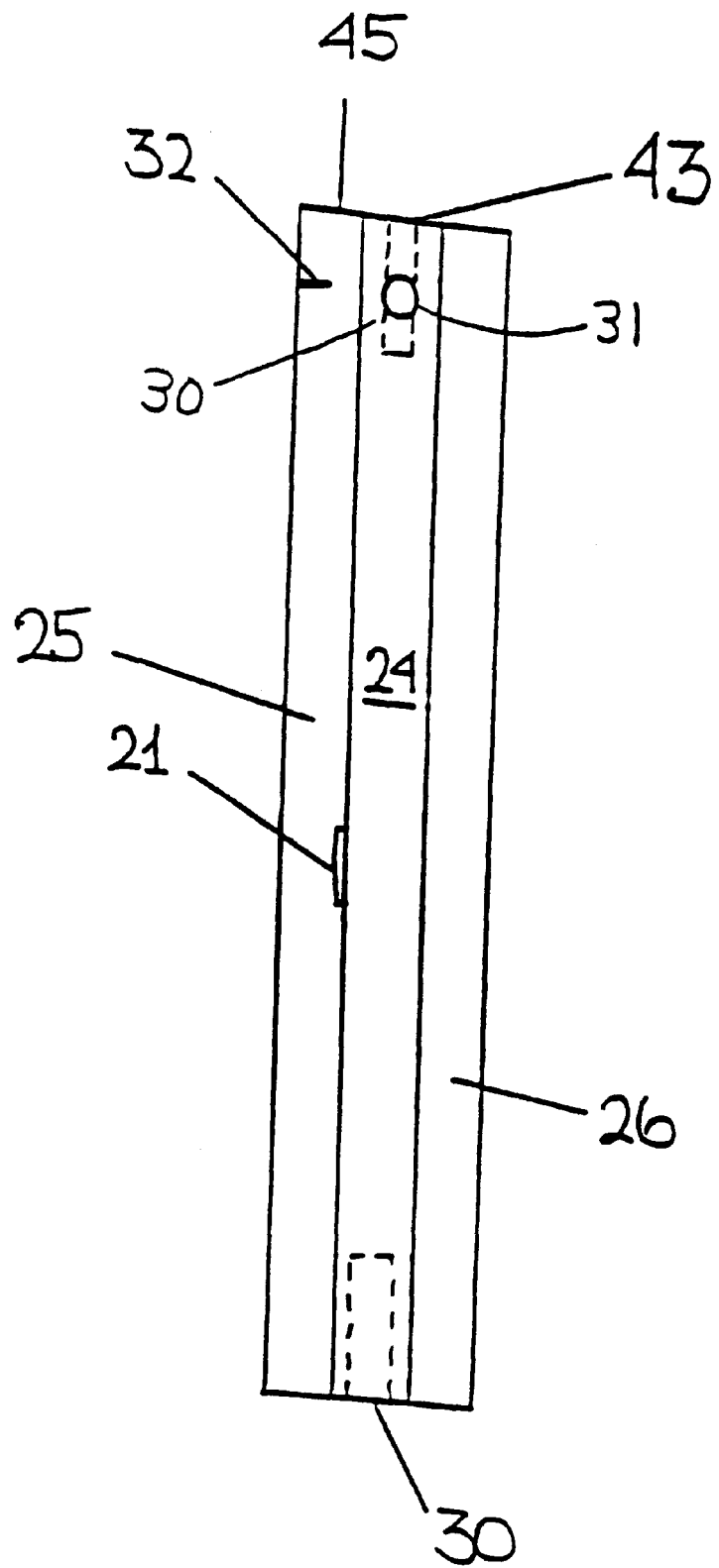
FIG. 3 is a top view of the compact laser sighting apparatus shown in FIG. 1.

The sighting device 40 may also have at least one chamber which is located to project a laser beam through an aperture in an elongated surface of the housing. FIGS. 1 and 3 show chamber 31 located in column member 43. Chamber 31 is located to project a laser beam though an aperture in edge 24 of column 43.

Figure 4:
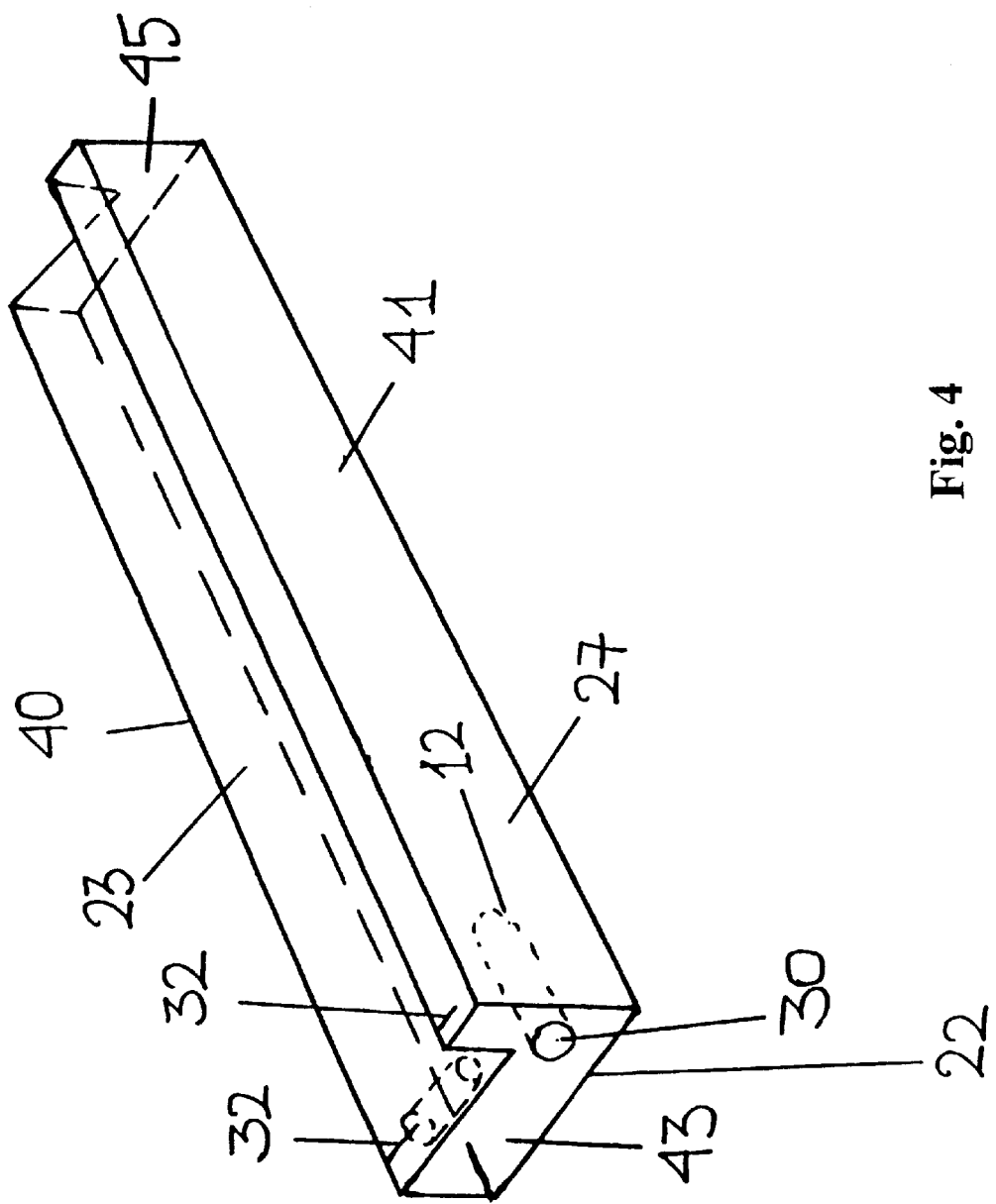
FIG. 4 is a perspective view of another embodiment of a compact laser sighting device, according to the invention, having a "L" cross-section.
Figure 5:
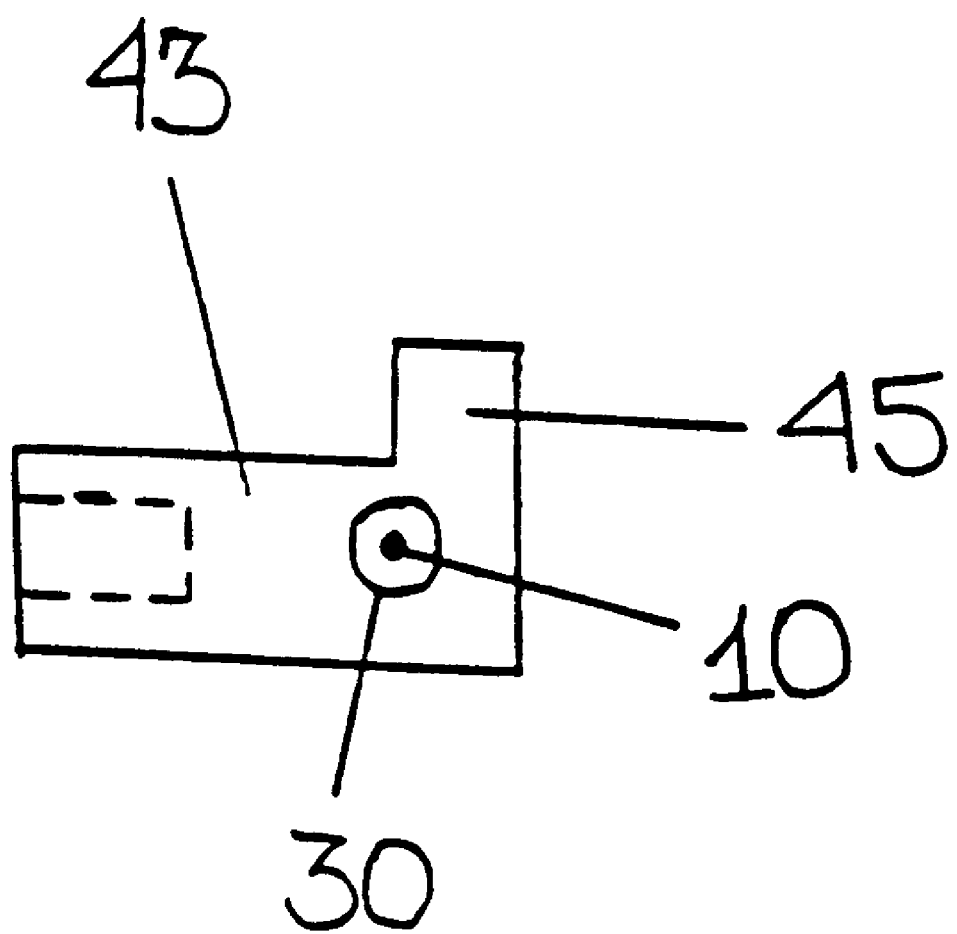
FIG. 5 is a perspective view of yet another embodiment of a compact laser sighting device, according to the invention, having a "L" cross-section.

In some embodiments, the sighting device 40 has an "L" cross-section, as shown in FIGS. 4 and 5. However, in a preferred embodiment, an axial view of the housing of the sighting device resembles a "T", as shown in FIGS. 1 and 2, to allow for ease of use, especially if there is an axially oriented laser 10, at only one axial end.

Preferably, the chambers housing each laser module permit the laser module to project its laser beam perpendicular to the surface through which it projects.

The sighting device 40 may have any number of laser modules situated therein. For example, there may be three laser modules in base member 45 and one laser in column member 43, so that one laser projects axially from chamber 30, and the other lasers project through apertures in edge surfaces 24, 28 and 29. In another example, each end of device 40 may have an axial laser and a transverse laser so that at one end of device 40 an axial laser projects from chamber 30 and a transverse laser projects from chamber 31, and at the other end of device 40 an axial laser projects through end surface 33 and a transverse laser projects through edge surface 24.

Preferably, there is a means for selectively activating individual or multiple laser modules in the sighting device.

Preferably there is a transparent overlay having sighting cross-hairs shown in the drawings) placed between the laser diode and the aperture in the sighting device 40.

Preferably the sighting device 40 is compact so that it is easily carried, and stored when not in use in a pocket or pouch. By way of example, the housing 41 of the compact laser sighting device 40 may have a overall length ranging from about 4 inches to about 8 inches long, so that it might comfortably fit in a shirt pocket or in a pants pocket.

The thickness of the column member 43, i.e. the distance between opposing surfaces 22 and 23, needs to be thicker than the portion of the laser modules 12 housed in it, or thicker than the electrical supply source for the lasers, if housed in the column member. With current art, laser modules are approximately ¼ inch in diameter and AAA batteries are approximately the same diameter. Therefore the column member 43 may need to be at least about 5/16 inches thick. As a preactical matter, column member 43 may be as thick as about one inch. Sheets of drywall sections are generally ⅜ of an inch to ½ an inch thick.

Preferably, the width of a face 25 of the base member 45 is less than the thickness of the drywall section the sighting device will be pressed against.

In a preferred embodiment, indicia (markings) extends continuously around the sighting device 40, perpendicular to the sighting device's longitudinal rail surfaces, in the vicinity of the laser mounted perpendicularly to an axially oriented laser.

In another embodiment, indicia 32 extends discontinuously around the sighting device, perpendicular to the sighting device's longitudinal rail surfaces, in the vicinity of the laser mounted perpendicularly to an axially oriented laser, as shown in FIG. 1.

The device's laser modules 12 may be activated with an on-off switch. A variety of switches are suitable. For example flush mounted switches, including a sliding on-off switch 21, a pressure sensitive flush mounted button switch on a handle grip portion, a pressure sensitive button switch slightly protruding on the surface of a rail, or a heat sensitive flush mounted switch on the handle grip portion.

The laser modules 12 may comprise a front tube fitted into a chamber 30 and stopped at a lens against an O-ring, a laser diode and a trigger circuit board. The laser diode may be connected to the trigger circuit board by welding, soldering, a fastened screw, or other suitable fastening device. The trigger circuit board may be connected to said switch 21. The lens (not shown in the drawings) may be fitted with an overlay, to provide a projected image displaying cross-hairs. The lens serves, in part, to keep dust from entering chamber 30.

Figure 6:
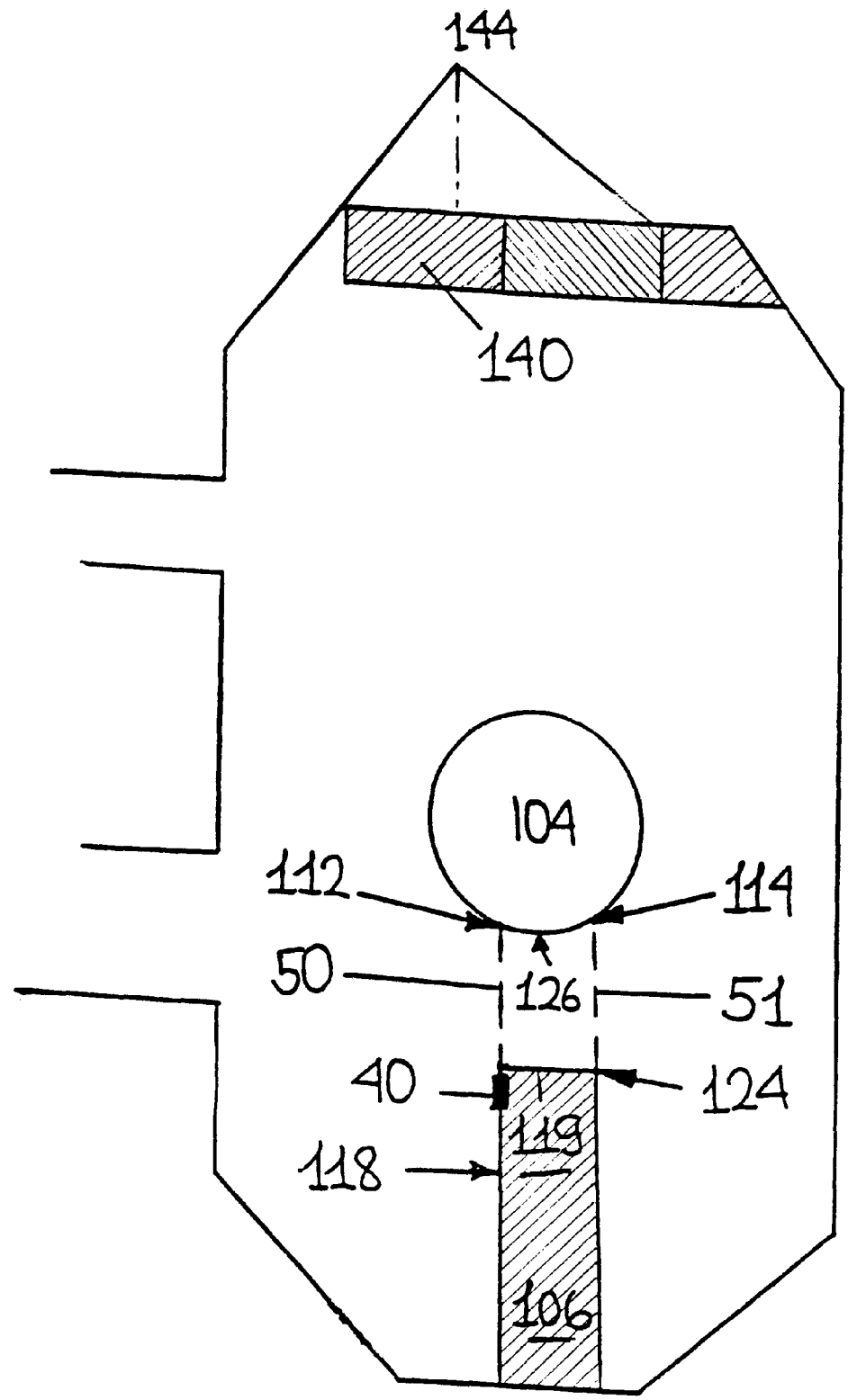
FIG. 6 is a plan view of a ceiling having an alcove section and a drop down section.

A so-called in-line method of using the sighting device is now discussed, particularly in relation to FIG. 6. A "T" shaped sighting device 40 is placed longitudinally against a finished edge 118 of installed drywall section 106. This allows a user to project a laser beam 50, from an axially mounted laser in sighting device 40, to the perimeter of the ceiling's drop-down section 104, to determine the location of first point 112 on drop-down section 104. After noting the location of point 112 on drop-down section 104, the length of the finished edge of the next drywall section, which will fill in the gap between the end 119 of the installed drywall section 106 and point 112, may be measured by the user. This length will be the length of one side of the next drywall section.

Similarly, the location of second point 114 on drop-down section 104 may be obtained by pressing the "T" shaped sighting device 40 against the opposite edge 124 of installed drywall section 106. A laser beam 51 is projected from an axially mounted laser of the sighting device 40 to a second point 114 on the perimeter of the drop-down section 104. After noting the location of point 114, the length of another finished edge of the next drywall section, which will fill in the gap between drywall section 106 and drop-down section 104, may be measured by the user. This length will be the length of the other side of the next drywall section.

If, as shown in FIG. 6, the drop-down section has a curve, or is otherwise shaped in a line other than a straight line between points 112 and 114, it is desirable to determine the positions of intermediate points, between points 112 and 114. A so-called perpendicular method is useful for determining such intermediate points. The perpendicular method is also useful for determining odd-shaped gaps which need to be filled with new drywall sections. The perpendicular method is now discussed with particular reference to FIG. 7.

Figure 7:
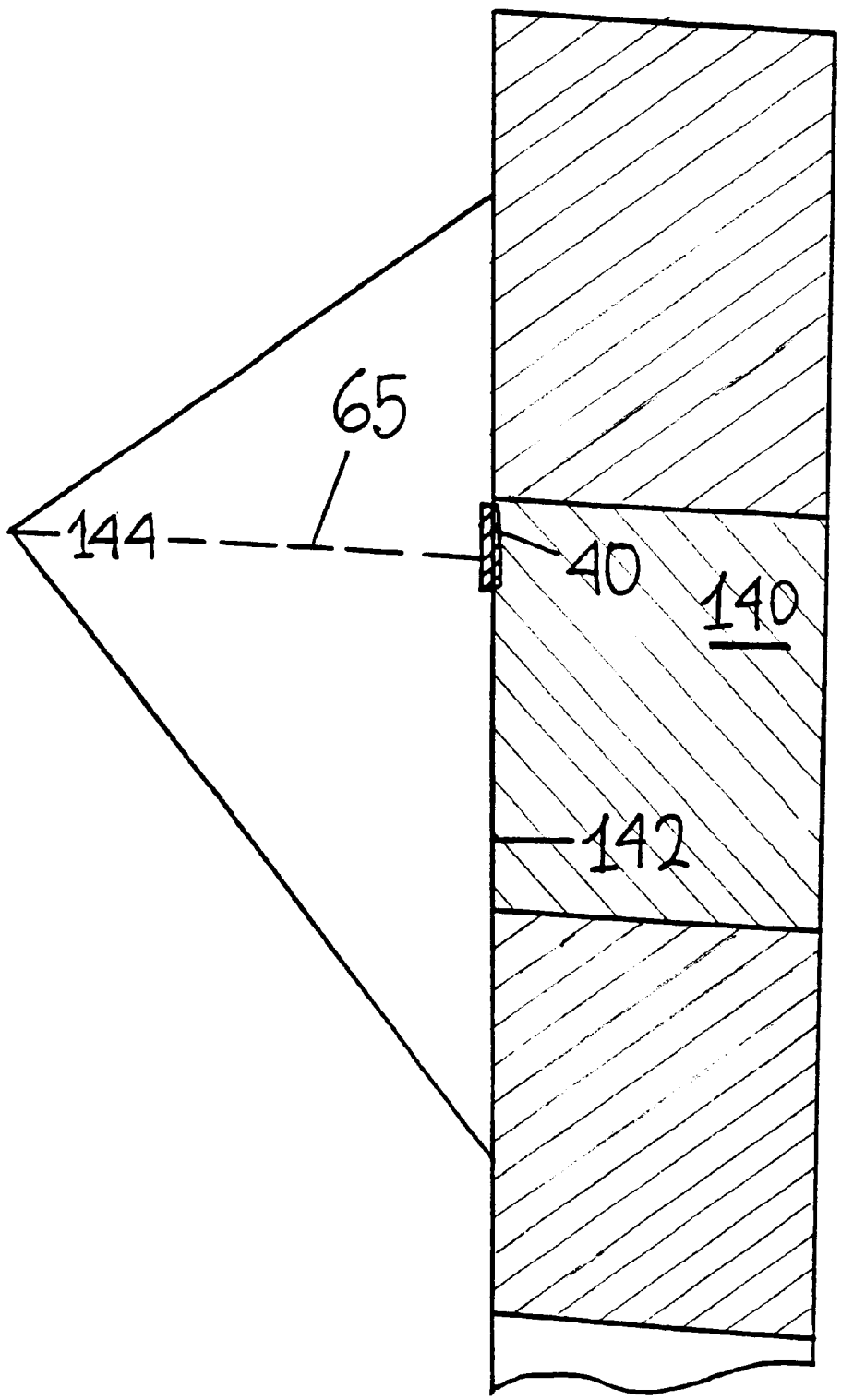
FIG. 7 is a blown-up view of the alcove section, of the ceiling in FIG. 6, utilizing the method described herein.

FIG. 7 shows an alcove having an apex 144 of a gap in a ceiling, opposite a side of a finished edge 142 of a drywall sheet 140 which is immediately adjacent to the alcove. A longitudinal edge of sighting device 40 is placed against longitudinal edge 142 of the previously installed drywall section 140. A laser beam 65 is projected perpendicularly to the longitudinal edge of the sighting device. Sighting device 40 is slid along the longitudinal edge 142 of the previously installed drywall section 140 until the laser beam strikes the apex 144 in the alcove. The location, along the longitudinal edge 142 on the previously installed drywall section, which is in line with laser beam 65, is noted. Noting of the location is aided by the provision of a marking (indicia) on sighting device 40 adjacent to the transverse laser module which projects beam 65. The distance between the noted location and the apex can then be measured. Other distances between the installed drywall section 140 and points on the perimeter of the alcove can similarly be determined. For gaps which are triangular, the method of the present invention permits determining the locations of apices of an imaginary right angled triangle, and the height and base width of the triangle which is bounded by longitudinal edge 142, the line perpendicular to edge 142 which intersects apex 144, and an edge of the ceiling within the alcove. The piece of drywall which is to fit in the imaginary triangle can then be measured and cut.

Whether the in-line or perpendicular method is used, a new drywall section can be cut to the right shape and size to fit in the gap, and then fixed in place by known methods. Clearly, if the new drywall section is insufficient to completely fill the gap, the process can be repeated.

As indicated herein before, the perpendicularly oriented laser can be used to determine various corresponding intermediate points, for example as shown in FIG. 6. Intermediate points along the perimeter of the dropdown section 104, between points 112 and 114, which are perpendicular to the leading edge of drywall section 106, can be determined. Then corresponding lengths can be determined of the gap at those intermediate points between drywall section 106 and drop-down section 104, to accurately size a new drywall section to fill in the gap.

Further uses of the axially and perpendicularly oriented lasers will become apparent to those engaged in the use of the apparatus. For example, although the use of the invention has been illustrated with respect to ceilings, the sighting device can equally well be applied to placement of drywall to walls. The specific embodiments and examples set forth above are provided to illustrate the invention and are not intended as limiting. Additional embodiments within the scope of the claims will be apparent to those skilled in the art.

What is claimed is:

1. A sighting device comprising:
   (a) a housing; and
   (b) at least one laser module;
      wherein the housing comprises a longitudinally elongated base member and a longitudinally elongated column member, said base member and column member being joined longitudinally to one another at right angles to one another, thereby defining a rail, each of said base member and column member having
         i) opposing parallel and substantially flat longitudinal faces and
         ii) an edge surface extending between the longitudinal faces; and
      the housing has at least one chamber, with each chamber housing a laser module; and
      wherein each chamber has an aperture to communicate laser light out of a surface of the housing.

2. The sighting device according to claim 1, wherein the sighting device has an electrical supply means associated therewith, a trigger circuit board connected to the electrical supply means, a laser diode electrically connected to the trigger circuit board, an on-off switch for controlling supply of electricity between the electrical supply means and the laser diode.

3. The sighting device in claim 1, wherein at least one aperture is located at an axial end of the elongated housing.

4. The sighting device according to claim 1, wherein at least one aperture is located to project through an elongated surface of the housing, perpendicular to the longitudinal direction of the housing.

5. The sighting device according to claim 1, wherein the aperture of an axial projecting laser module is about half way into the base member and about half way into the column member.

6. The sighting device according to claim 1, wherein a cross-section of the housing, transverse to the longitudinal direction, is in the shape of a "T." or an "L".

7. The sighting device according to claim 1, wherein the chamber for each laser module permits the laser module to project its laser beam perpendicular to the surface through which it projects.

8. The sighting device according to claim 1, which has a means for selectively activating the laser modules.

9. The sighting device according to claim 1, wherein a transparent overlay having cross-hairs is placed between the laser diode and the aperture.

10. The sighting device according to claim 1, wherein indicia extends continuously around the sighting device, perpendicular to the longitudinal direction of the sighting device, in the vicinity of a laser mounted perpendicularly to an axially oriented laser.

11. The sighting device according to claim 1, wherein indicia extends discontinuously around the sighting device, perpendicular to the longitudinal direction of the sighting device, in the vicinity of a laser mounted perpendicularly to an axially oriented laser.

12. A sighting device according to claim 2 which also has a lens held at the aperture to the chamber.

* * * * *